Dec. 20, 1955     T. C. LORENZEN     2,727,708

CHRISTMAS TREE HOLDER OR STAND

Filed Sept. 8, 1953

INVENTOR
THORVALD C. LORENZEN

ATTORNEYS

United States Patent Office 2,727,708
Patented Dec. 20, 1955

2,727,708

CHRISTMAS TREE HOLDER OR STAND

Thorvald C. Lorenzen, Racine, Wis.

Application September 8, 1953, Serial No. 378,930

1 Claim. (Cl. 248—47)

This invention appertains to Christmas tree holders, flagstaff holders, and the like, and more particularly to a novel Christmas tree stand which will effectively engage and hold the tree upon the mere placing of the tree trunk in the stand, and without the necessity of adjusting any screws, driving nails and the like.

One of the primary objects of my invention is to provide a Christmas tree stand embodying a centrally disposed cup for receiving the base of the tree trunk and a plurality of legs pivoted adjacent to their upper ends to the cup, the arrangement being such that upon insertion of the tree in the trunk, the lower ends of the legs will move outwardly to form a spreading, sturdy base and the upper ends inwardly into gripping contact with the tree.

Another salient object of my invention is the provision of means for forming the upper end of the cup whereby the same will form effective guides for the upper ends of the legs, means being provided for normally urging the legs to a collapsed position against the cup and away from the tree trunk, means also being provided for limiting the swinging movement of the legs under the influence of the springs.

A still further object of my invention is to provide a Christmas tree stand which will be durable and efficient in use, one that will be simple and easy to manufacture, and one which can be placed upon the market at a reasonable price.

Figure 1:
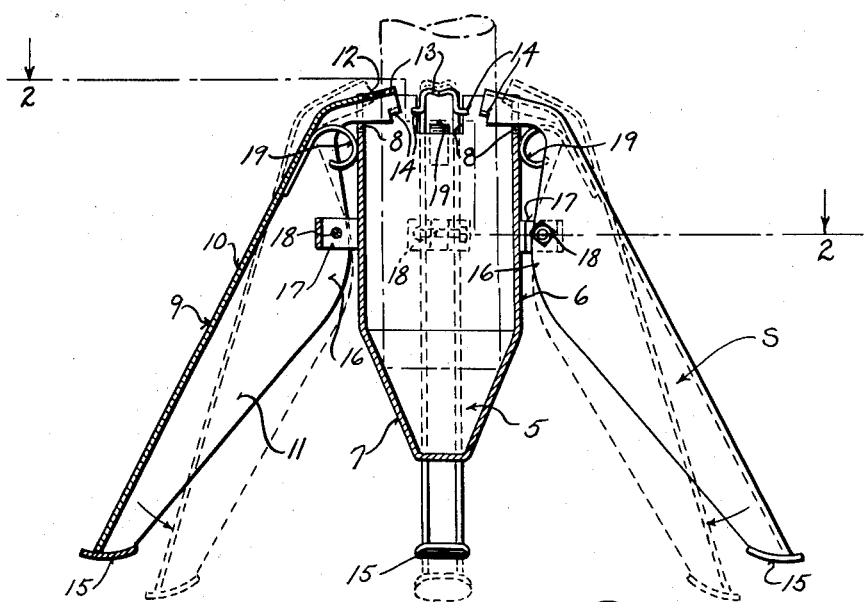

With these and other objects in view, the invention consists in the novel construction, arrangement and formation of parts, as will be hereinafter more specifically described and claimed, and illustrated in the accompanying drawing, in which drawing, Figure 1 is a vertical sectional view through the stand showing the same in its partially collapsed position in dotted lines and in its partially spread position in full lines, the section being taken on the line 1—1 of Figure 2, looking in the direction of the arrows.

Figure 2:
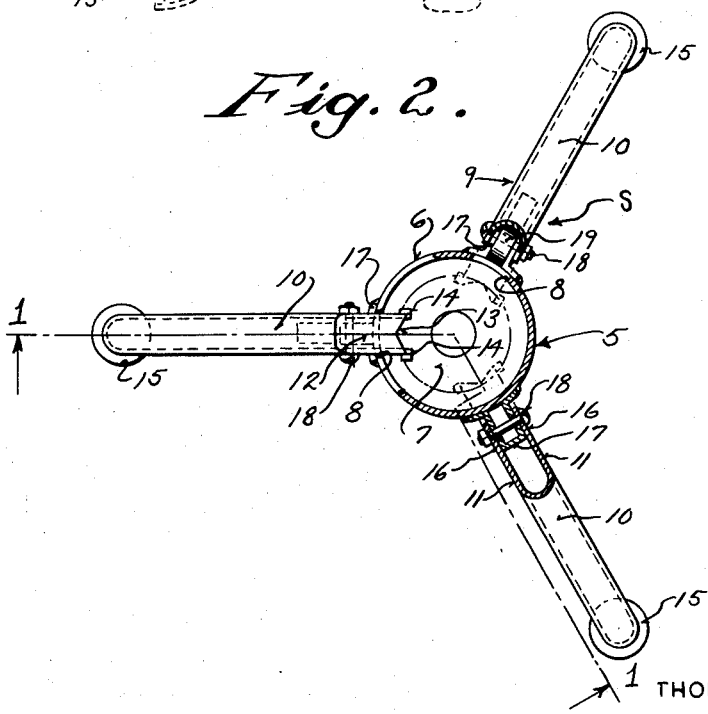

Figure 2 is a horizontal sectional view through the stand taken on the line 2—2 of Figure 1, looking in the direction of the arrows.

Referring to the drawing in detail, wherein similar reference characters designate corresponding parts throughout the several views, the letter S generally indicates my improved stand and the same embodies a vertically disposed cup 5 for receiving the base of a Christmas tree, as suggested in dotted lines in the drawing. The cup is preferably, but not necessarily, formed from sheet metal and includes a cylindrical side wall 6 and a tapering conical bottom wall 7. The bottom wall 7 functions to center the tree in the cup. At equidistantly spaced points, the upper edge of the wall 6 is provided with cut out portions or guide notches 8, the purpose of which will later appear.

Fulcrumed upon the cup are a plurality of legs 9 shown in this instance to be three in number. The legs 9 are also preferably formed from sheet metal, and the same are folded longitudinally to provide an outer wall 10 and spaced parallel side walls 11. The legs in cross-section are of a substantially U-shape. Formed on the upper ends of the legs are angularly extending arms 12 and these arms ride into the guide slots 8, and the walls of these slots form means for preventing lateral shifting of the arms 12. The extreme upper terminals of the arms can be provided with V-shaped notches 13 which form biting edges for engaging the tree trunk. The corners of the arms are struck out to form laterally extending ears 14 and these ears engage the inner face of the cup when the legs are swung back against the cup. Hence, the ears form means for limiting the outward movement of the arms 12 and the ears hold the arms in the guide notches 8. The lower ends of the legs are provided with feet 15 for engaging the floor.

It is to be noted that the side walls 11 of the legs increase in width intermediate their ends, to form fulcrum shoulders 16, and it is to be noted that these shoulders are disposed closer to the upper ends of the legs than to the lower ends of the legs. Secured to the cup below the guide notches 8 are brackets 17, and the side walls 11 of the legs 9 embrace the opposite sides of the brackets. Pivot bolts 18 extend through the shoulders 16 of the legs and through the brackets 17 and form means for pivotally supporting the legs.

In order to normally urge the legs to a collapsed position close to the cup 5, with the arms 12 moved outwardly, leaf springs 19 are welded, or otherwise fastened to the legs adjacent to their upper ends and these springs bear against the outer face of the cup directly below the guide notches 8. The lugs 14 limit the outward swinging movement of the arms as heretofore stated.

In use of my stand, and considering that the arms 12 are moved outwardly by the springs 19, then the base of a tree trunk is placed into the cup against the conical lower wall 7. The weight of the tree pushes down on the stand and spreads the lower ends of the legs outwardly against the tension of the springs 19 and the arms 12 inwardly against the tree trunk, and these arms will effectively engage and bite into the tree trunk. The heavier the tree, the greater the tendency of the legs to spread out with the arms in.

From the foregoing description, it can be seen that I have provided an exceptionally simple and durable form of Christmas tree stand, which will occupy a minimum amount of space in shipping and storing and one which can be quickly set up to receive a trunk of a tree without the necessity of employing tools, nails or the like.

Changes in details may be made without departing from the spirit or the scope of this invention, but what I claim as new is:

A Christmas tree holder comprising a vertically disposed cup including a cylindrical side wall and a conical bottom wall, the upper edge of the cylindrical side wall being provided with guide notches at spaced points, brackets secured to the outer face of the cup directly below the guide notches, legs of a U-shape in cross-section embracing the brackets, pivot members connecting the legs to the brackets, floor engaging feet on the lower ends of the legs, angularly extending inwardly directed arms formed on the upper ends of the legs received in the guide notches, spring means between the upper ends of the legs and the cup for normally urging the arms outwardly and struck out lugs formed on the extreme outer ends of the arms for engaging the inner face of the cup on opposite sides of the notches for limiting the outward swinging movement of the arms and the inward swinging movement of the lower ends of said legs.

References Cited in the file of this patent

UNITED STATES PATENTS

| | | |
|---|---|---|
| 224,624 | Albrecht | Feb. 17, 1880 |
| 1,117,158 | Bernatz et al. | Nov. 17, 1914 |
| 1,713,673 | Nelson | May 21, 1929 |
| 2,622,829 | Waltz | Dec. 23, 1952 |